T. Bell,
Fish Net.
N° 76,387.   Patented Apr. 7, 1868.
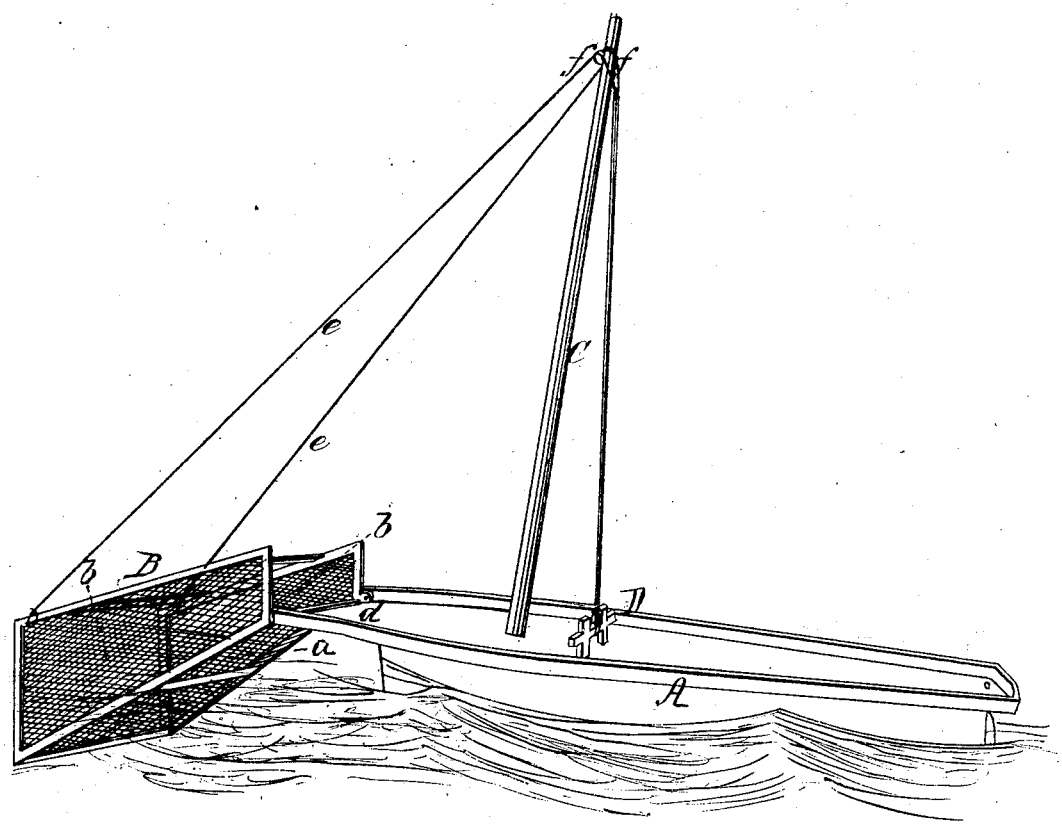
Witnesses:
H. C. Ashkettle
J. Fraser
Inventor:
Thos Bell
per Munn & Co
attorneys

United States Patent Office.

THOMAS BELL, OF BELLPORT, NEW YORK.

Letters Patent No. 76,387, dated April 7, 1868.

FISHING-ATTACHMENT FOR VESSELS.

*The Schedule referred to in these Letters Patent and making part of the same.*

TO ALL WHOM IT MAY CONCERN:

Be it known that I, THOMAS BELL, of Bellport, in the county of Suffolk, and State of New York, have invented a new and improved Fish-Catching Attachment for Vessels; and I do hereby declare that the following is a full, clear, and exact description thereof, which will enable others skilled in the art to make and use the same, reference being had to the accompanying drawings, forming part of this specification.

This invention relates to a new and improved fish-catching attachment to be applied to vessels, either steamers or those provided with sails.

The invention is designed for catching those kinds of fish which swim near the surface of the water, such, for instance, as the mackerel and herring species, and which are caught in large quantities for salting or curing for food, the extraction of oil, and for manure.

The invention consists in attaching to the front or bow of the vessel, by a hinge or joint, a scoop-shaped screen, which may be made by covering a frame with wire cloth, and so arranged that its front part may be let down a sufficient distance below the surface of the water, and its bottom form an incline plane from the deck or upper part of the bow of the vessel down to the front end of the device, which, as the vessel sails along, will gather or enclose the fish, the device, at suitable intervals, being raised, so as to discharge the fish upon the deck of the vessel.

The accompanying drawing represents a perspective view of my invention applied to a vessel.

A represents a vessel, which may be propelled by steam or wind, and B represents my invention, consisting of a frame, so constructed as to have a flat bottom, $a$, and two sides, $b\ b$, which diverge from each from the rear to the front end of the device, so that the latter will be considerably wider at its front than at its rear end, both the front and rear ends being open. This frame is covered with wire netting or coarse wire cloth, the mesh of which should be sufficiently small to retain the smallest fish designed to be caught. Twine netting might be used, but the wire would be more durable, and probably the most economical in a quite limited period of time. The frame may be constructed of wood or metal; if of the latter, coarse wire or light rods may be employed for the purpose. The rear end of this device is attached by a joint or hinges, $d$, to the front end or bow of the boat, and to the front end of the upper part of each side $b$ there is attached a cord or rope, $e$. These cords or ropes extend upward, and pass through sheaves, $f$, attached to the upper part of the mast, C, of the vessel, and extend down, and are attached to a windlass or any proper fixture, D, on the deck of the same.

The device when in use has its front part extending obliquely below the surface of the water, as shown clearly in the drawing, its bottom, $a$, forming an inclined plane, and the cords or ropes $e\ e$ retaining the device in proper position as the vessel sails along.

At suitable intervals, the front part of the device is raised out of the water, by pulling down on the ropes or cords $e\ e$, and any fish which may be within the device, or enclosed between its two sides $b\ b$, will of course be raised with it, and when the bottom, $a$, reaches a certain angle of elevation, say forty-five degrees, the fish will be discharged upon deck. On releasing the cords or ropes $e\ e$, the device will descend to its original position by its own gravity.

I do not confine myself to any particular shape or manner of constructing the device, nor to any particular means for elevating the same, for the plans herein described may be varied or modified, and the same end attained.

Having described my invention, I claim as new, and desire to secure by Letters Patent—

A device for catching fish, constructed and applied to a vessel substantially in the manner as herein set forth.

The above specification of my invention signed by me, this 11th day of January, 1868.

THOS. BELL.

Witnesses:
 WM. F. MCNAMARA,
 ALEX. F. ROBERTS.